US00RE38696E

(19) United States
(12) Reissued Patent
Williams

(10) Patent Number: US RE38,696 E
(45) Date of Reissued Patent: Feb. 8, 2005

(54) POP-UP ADVERTISING PIECE

(75) Inventor: Bruce D. Williams, Round Lake, IL (US)

(73) Assignee: R. R. Donnelley & Sons Company, Chicago, IL (US)

(21) Appl. No.: 10/277,211

(22) Filed: Oct. 21, 2002

Related U.S. Patent Documents

Reissue of:
(64) Patent No.: 6,192,608
Issued: Feb. 27, 2001
Appl. No.: 09/328,063
Filed: Jun. 8, 1999

U.S. Applications:
(60) Provisional application No. 60/088,462, filed on Jun. 8, 1998.

(51) Int. Cl.[7] ..... G09F 1/00
(52) U.S. Cl. ..... 40/124.08; 40/124.07; 40/124.11; 40/124.14; 229/92.8; 283/65; 446/148
(58) Field of Search ..... 40/124.01, 124.07, 40/124.08, 124.09, 124.11, 124.14; 229/92.8; 283/65; 446/148

(56) References Cited

U.S. PATENT DOCUMENTS 1,038,652 A * 9/1912 Reese ..... 40/124.01
1,058,830 A * 4/1913 Witkowski ..... 229/87.5
2,017,637 A * 10/1935 Smith ..... 229/92.5
2,148,279 A * 2/1939 Sandberg
2,884,184 A * 4/1959 Turan ..... 229/92.1
3,035,363 A * 5/1962 Luchsinger
3,141,549 A * 7/1964 Koehler ..... 206/232
3,159,329 A * 12/1964 Hiersteiner ..... 229/68.1
3,191,328 A * 6/1965 Lohnes
3,855,726 A * 12/1974 Yumoto
5,010,669 A * 4/1991 Moran ..... 40/539
5,259,133 A * 11/1993 Burtch ..... 40/124.1
5,611,161 A * 3/1997 Murphy ..... 40/124.08
5,778,574 A * 7/1998 Reuben ..... 40/124.03
5,933,989 A * 8/1999 Volkert et al. ..... 40/124.08

* cited by examiner

*Primary Examiner*—Brian K. Green
(74) *Attorney, Agent, or Firm*—Grossman & Flight, LLC.

(57) ABSTRACT

In order to create interest in advertising pieces in a consumer, a pop-up advertising piece includes a booklet-shaped advertiser movable from a closed position to an open position. An anchoring strip is in vertical confronting relation to a normally inwardly facing surface of one of the cover portions and has top and bottom edges secured to the normally inwardly facing surface in general proximity to top and bottom edges thereof. An internal substrate has one vertical edge secured to the one of the cover portions opposite the anchoring strip and the other vertical edge is secured to the anchoring strip. A first fold line is provided on the internal substrate in spaced relation to a generally vertical fold line of the booklet-shaped advertiser when it is in the closed position. The internal substrate also has a second fold line on the side of the anchoring strip opposite the first fold line. By positioning the internal substrate to pass under the anchoring strip, the vertical edges of the internal substrate are secured so as to cause the portion between the second fold line and the anchoring strip to pop-up when the booklet-shaped advertiser is moved from the closed position to the open position.

2 Claims, 4 Drawing Sheets

POP-UP ADVERTISING PIECE

Matter enclosed in heavy brackets [ ] appears in the original patent but forms no part of this reissue specification; matter printed in italics indicates the additions made by reissue.

This application claims priority from U.S. provisional patent application serial No. 60/088,462, filed Jun. 8, 1998.

FIELD OF THE INVENTION

The present invention is generally directed to advertising techniques and, more particularly, an advertising piece that includes a pop-up feature.

BACKGROUND OF THE INVENTION

In order to generate interest in advertising, there have been many diverse techniques utilized over the years. This is true in all forms of advertising including advertising that is in sheet or booklet form where, in addition to the written and/or graphical content, there may be other features associated with the advertising piece. Moreover, it is known that advertising of this type, i.e., that of the sheet or booklet form, may be used as an advertising mailer.

In fact, there have been mailers that not only serve an advertising function but that may also carry merchandise. This type of mailer is disclosed, for instance, in Witkowski U.S. Pat. No. 1,058,830. As disclosed in the Witkowski '830 patent, a card is formed with means for retaining a box on the card.

In a peripherally related field, there have been several proposals for mailers that have devices of a unique nature. Koehler U.S. Pat. No. 3,141,549 discloses a foldable postal card that includes a tab that is to be pulled for unfolding and flipping a rear panel portion. Moran U.S. Pat. No. 5,010,669 discloses a postcard with a pop-out figure where the marginal areas of the card can be folded into a base for supporting the figure. In addition, there have been many other forms of mailers, advertising pieces, and the like that have unique characteristics.

Despite this fact, there is a continuing need for advertising pieces that are capable of generating consumer interest. This is particularly true in the case of advertising mailers which must necessarily capture the attention of the consumer upon receipt in order to successfully instill the message that is being conveyed by the advertising piece. Concomitantly, the advertising piece must be unique while at the same time being capable of production at low cost.

The present invention is directed to overcoming one or more of the foregoing problems and accomplishing one or more of the resulting objects.

SUMMARY OF THE INVENTION

Accordingly, it is a principal object of the present invention to provide an advertising piece that has unique characteristics that will capture attention of a consumer. It is also an object of the invention to provide an advertising piece that incorporates a pop-up structure that, together with graphics and/or printed matter, conveys an advertising message. Additionally, it is an object of the present invention to provide a pop-up advertising piece that may be used as a mailer, newspaper or magazine insert, point-of-sale item, or the like, capable of capturing the attention of the recipient.

Thus, the present invention is directed to a pop-up advertising piece comprising a booklet-shaped advertiser defined by a front cover portion and a back cover portion integral therewith. The front cover portion has a normally inwardly facing surface and a normally outwardly facing surface, and the back cover portion also has a normally inwardly facing surface and a normally outwardly facing surface. With this booklet-shaped arrangement, the front cover portion is integrally associated with the back cover portion along a generally vertical fold line about which the advertising piece may be opened.

With regard to the booklet-shaped advertiser, it is movable from a closed position to an open position by the intended recipient when it arrives, e.g., through the mail. It is in the closed position when mailed with the normally inwardly facing surfaces of the front and back cover portions in directly confronting relation and, further, it can be moved from the closed position to the open position with the normally inwardly facing surfaces of the front and back cover portions facing outwardly in a common plane. Further, the pop-up advertising piece includes an anchoring strip in vertical confronting relation to the normally inwardly facing surface of one of the front and back cover portions.

As for the anchoring strip construction, it is formed to have a width which is substantially less than the width of the corresponding one of the front and back cover portions. The anchoring strip also has top and bottom edges secured to the inwardly facing surface of the corresponding one of the front and back cover portions in proximity to top and bottom edges thereof In addition, the pop-up advertising piece includes an internal substrate overlying at least a portion of the normally inwardly facing surfaces of each of the front and back cover portions.

More specifically, the internal substrate has one vertical edge secured from substantially top to bottom thereof to the normally inwardly facing surface of the one of the front and back cover portions opposite the anchoring strip. It also has the other vertical edge secured from substantially top to bottom thereof to the anchoring strip on the surface thereof opposite the normally inwardly facing surface of the corresponding one of the front and back cover portions. Still additionally, the internal substrate has a first fold line which is positioned so as to lie in spaced relation to the generally vertical fold line between the front and back cover portions when the booklet-shaped advertiser is in the closed position.

In addition to the first fold line, the internal substrate also has a second fold line on the side of the anchoring strip opposite the first fold line. The internal substrate extends from the first fold line to the second fold line between the anchoring strip and the inwardly facing surface of the corresponding one of the front and back cover portions. The vertical edges of the internal substrate are secured so as to cause the portion between the second fold line and the anchoring strip to pop up when the booklet-shaped advertiser is moved from the closed position to the open position. Furthermore, the second fold line of the internal substrate is caused to move into engagement with the anchoring strip thereby.

With the foregoing construction, the portion between the second fold line and the anchoring strip which pops up when the booklet-shaped advertiser is moved from the closed position to the open position is generally semi-cylindrical in shape. However, it does lie flat when the booklet-shaped advertiser is in the closed position and, as a result, the pop-up advertising piece may be used as a mailer by forming it in terms of size and shape so as to be in conformity with applicable postal regulations.

Other objects, advantages and features of the present invention will become apparent from a consideration of the following specification taken in conjunction with the accompanying drawings.

DETAILED DESCRIPTION OF THE PREFERRED EMBODIMENTS

Figure 1:
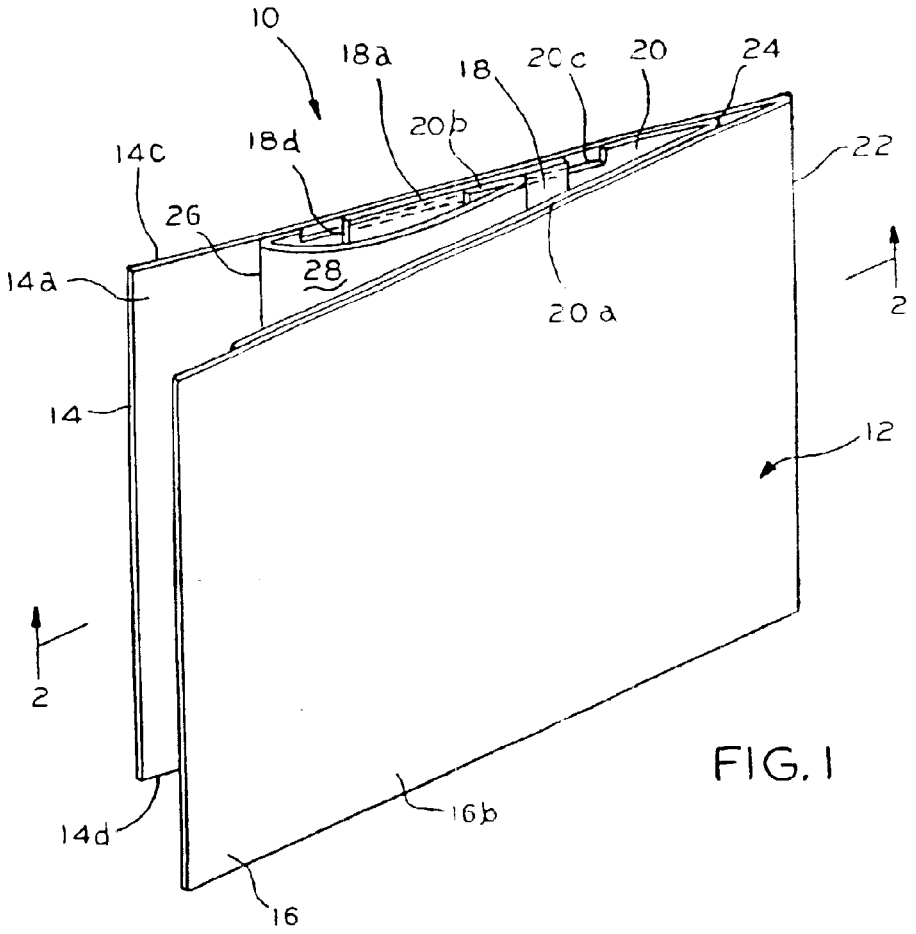
FIG. 1 is a perspective view of a first embodiment of a pop-up advertising piece in accordance with the present invention.

In the illustrations given, and with reference first to FIGS. 1–4, the reference numeral 10 designates generally a pop-up advertising piece in accordance with the present invention. The pop-up advertising piece 10 will be seen to comprise a booklet-shaped advertiser which is generally designated 12 and which is defined by a front cover portion 14 and a back cover portion 16 integral therewith. The front cover portion 14 has a normally inwardly facing surface 14a and a normally outwardly facing surface 14b and the back cover portion 16 also has a normally inwardly facing surface 16a and a normally outwardly facing surface 16b. The pop-up advertising piece 10 also includes an anchoring strip 18 and an internal substrate 20 overlying at least a portion of each of the normally inwardly facing surfaces 14a and 16a of the front and back cover portions 14 and 16, respectively. With this arrangement, the booklet-shaped advertiser 12 is movable from a closed position with the normally inwardly facing surfaces 14a and 16a in confronting relation to an open position with the normally inwardly facing surfaces 14a and 16a facing outwardly in a common plane.

Still referring to FIGS. 1–4, the front cover portion 14 will be understood to be integrally associated with the back cover portion 16 along a generally vertical fold line 22. It will also be appreciated that the anchoring strip 18 is in generally vertical confronting relation to the normally inwardly facing surface of one of the front and back cover portions which, in the embodiment illustrated in FIGS. 1–4, is the normally inwardly facing surface 14a of the front cover portion 14. As will be appreciated, the pop-up advertising piece 10 could just as well be formed such that the operative components are all revealed relative to their description in relation to the front and back cover portions 14 and 16.

Figure 3:
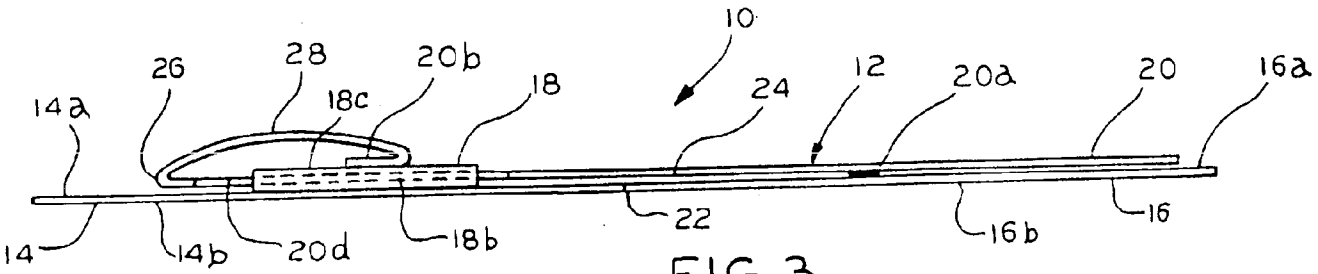
FIG. 3 is a front elevational view of the pop-up advertising piece of FIG. 1 shown in an open position.
Figure 4:
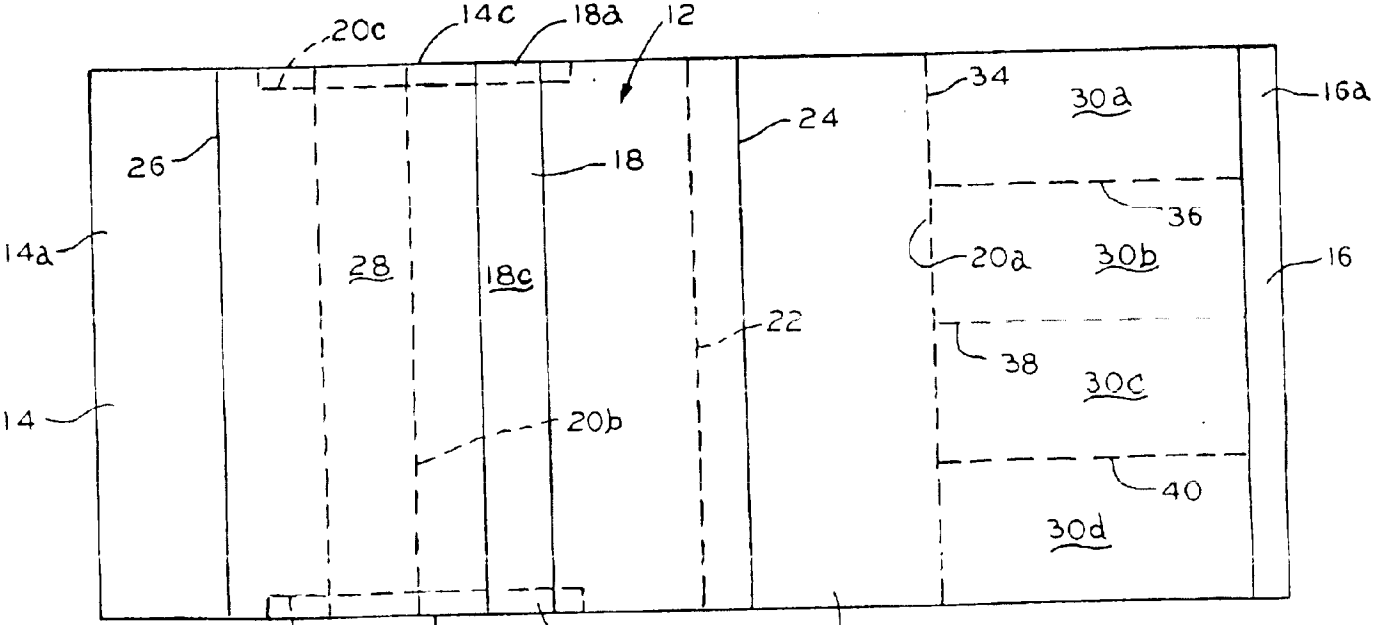
FIG. 4 is a top plan view of the pop-up advertising piece of FIG. 3 showing details thereof.
Figure 5:
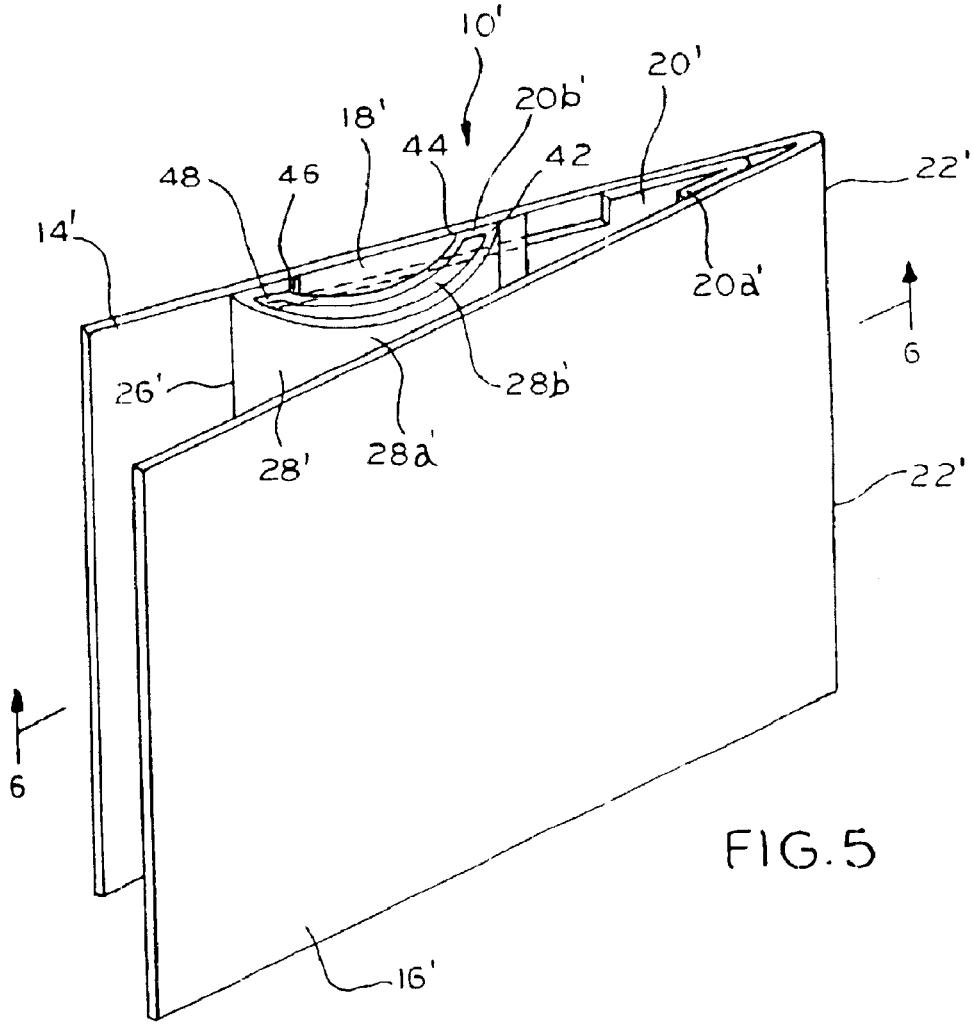
FIG. 5 is a perspective view of a second embodiment of the pop-up advertising piece in accordance with the present invention.
Figure 6:
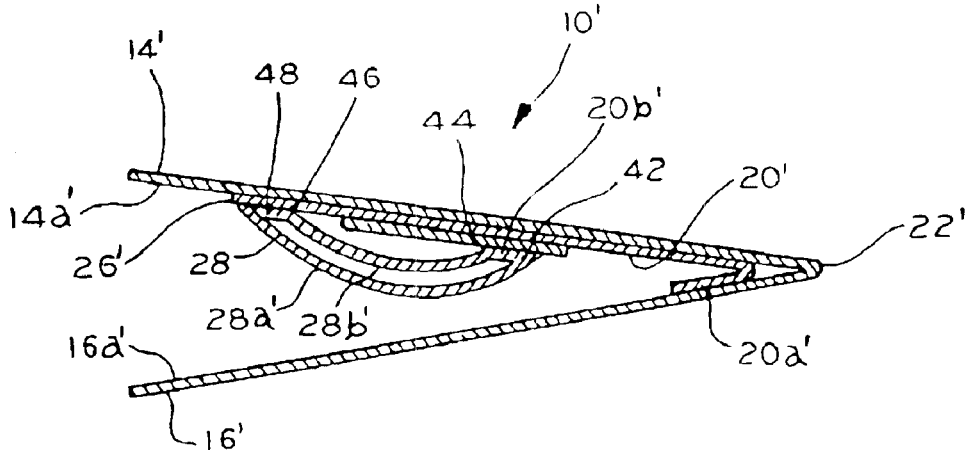
FIG. 6 is a cross-sectional view of the pop-up advertising piece taken generally along the line 6—6 of FIG. 5.
Figure 7:
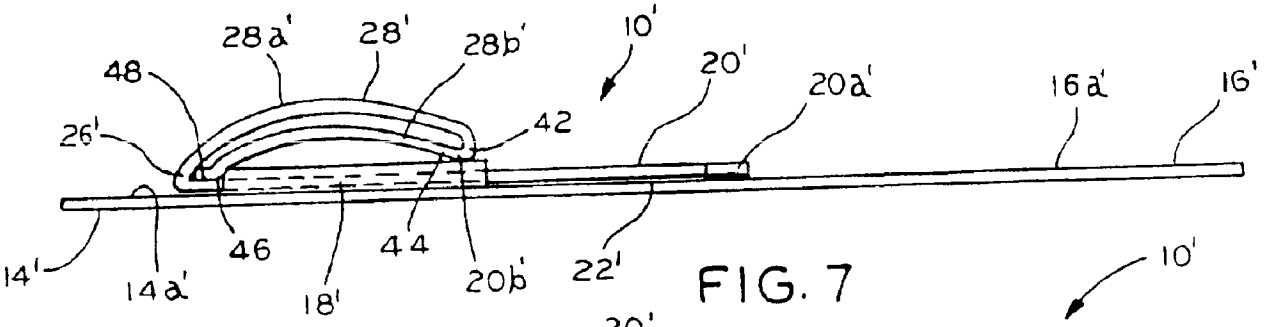
FIG. 7 is a front elevational view of the pop-up advertising piece of FIG. 5 shown in an open position.
Figure 8:
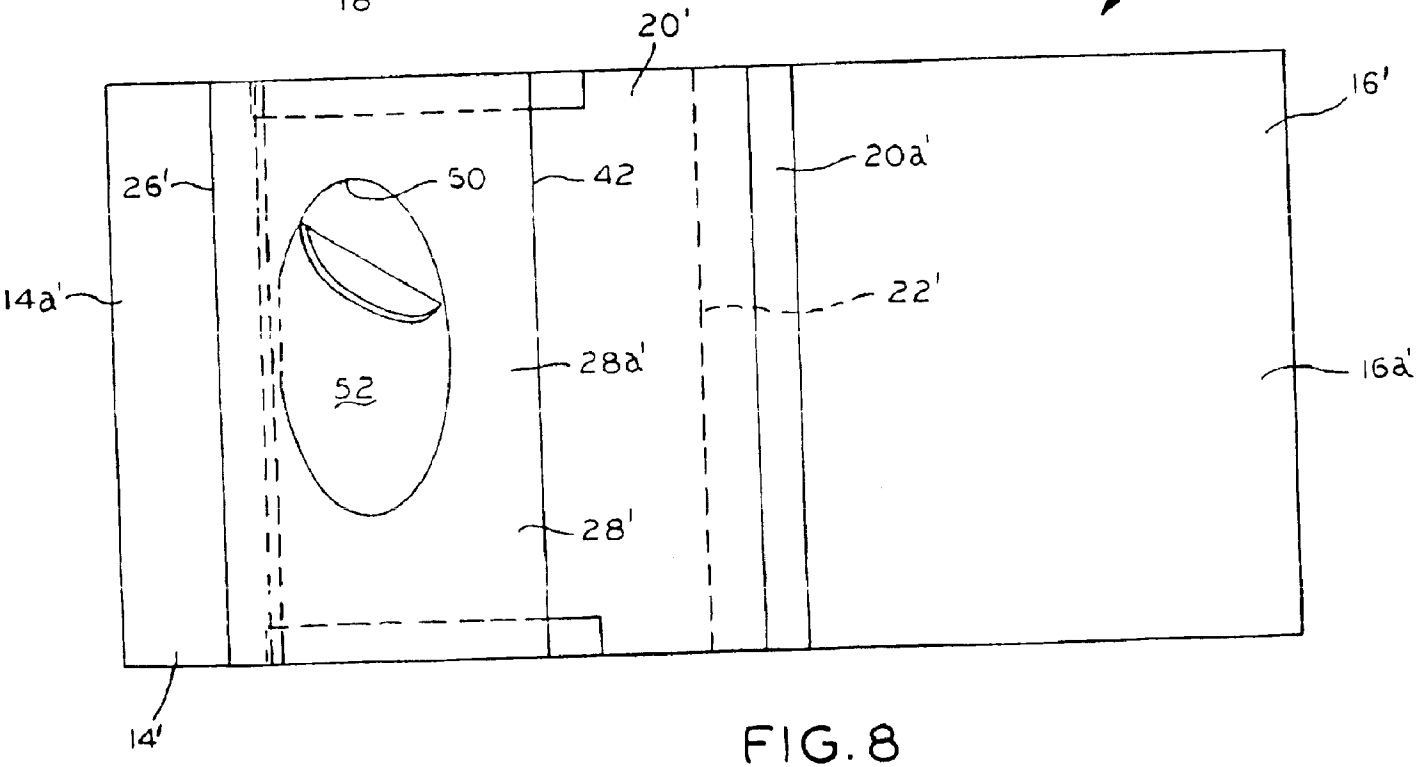
FIG. 8 is a top plan view of the pop-up advertising piece of FIG. 7 showing details thereof.

As best shown in FIGS. 3 and 4, the anchoring strip 18 has a width substantially less than the width of the corresponding one of the front and back cover portions, i.e., the front cover portion 14 in the illustrated embodiment. It will also be appreciated that the anchoring strip 18 has top and bottom edges 18a and 18b secured to the inwardly facing surface 14a of the front cover portion 14.

In the embodiment of FIGS. 1–4, the top and bottom edges 18a and 18b of the anchoring strip 18 are adhesively secured in proximity to top and bottom edges 14c and 14d of the normally inwardly facing surface 14a of the front cover portion 14.

With regard to the internal substrate 20, it has one vertical edge 20a secured from substantially top to bottom by an adhesive to the normally inwardly facing surface 16a of the back cover portion 16 opposite the anchoring strip 18. The internal substrate 20 also has the other vertical edge 20b secured by an adhesive from substantially top to bottom to the anchoring strip 18 on the surface 18c opposite of and facing away from the normally inwardly facing surface 14a of the front cover portion 14. Still further, and as best shown in FIG. 2, the internal substrate 20 has a first fold line 24 positioned to be in spaced relation to the generally vertical fold line 22 when the booklet-shaped advertiser 12 is in the closed position.

With this arrangement, the internal substrate 20 also has a second fold line 26 on the side of the anchoring strip 18 which is opposite the first fold line 24. The internal substrate 20 extends from the first fold line 24 to the second fold line 26 so as to pass under the anchoring strip 18, i.e., it passes between the anchoring strip 18 and the inwardly facing surface 14a of the front cover portion 14. The vertical edges 20a and 20b are secured so as to cause the portion between the second fold line 26 and the vertical edge 20b to pop up when the booklet-shaped advertiser 12 is moved from the closed position to the open position. As this occurs, the second fold line 26 of the internal substrate 20 moves into engagement with the edge 18d of the anchoring strip 18 to form a generally semi-cylindrical pop-up 28.

As will be appreciated and understood from FIG. 4, the internal substrate 20 is preferably notched as at 20c and 20d so as to avoid any interference with the top and bottom edges 18a and 18b of the anchoring strip 18 that are adhesively secured to the normally inwardly facing surface 14a of the front cover 14. This permits relative movement between the internal substrate 20 and the anchoring strip 18 such that the second fold line 26 can be moved from a position spaced from the edge 18d of the anchoring strip 18 when the booklet-shaped advertiser 12 is closed to a position in engagement with the edge 18d of the anchoring strip 18. Because of this movement, the portion of the internal substrate 20 between the second fold line 26 and the vertical edge 20b lies flat in contact with the surface 18c of the anchoring strip 18 when the booklet-shaped advertiser 12 is closed but forms the pop-up 28 when the booklet shaped advertiser 12 is opened.

Figure 2:
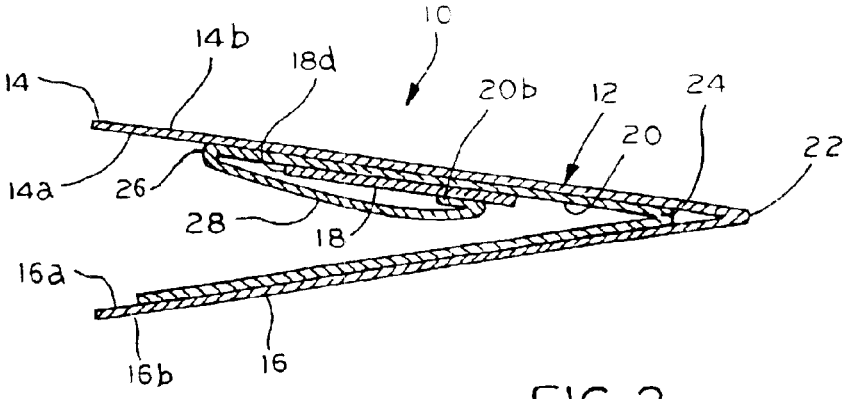
FIG. 2 is a cross-sectional view of the pop-up advertising piece taken generally along the line 2—2 of FIG. 1.

In other words, because the vertical edge 20a of the internal substrate 20 is secured to the normally inwardly facing surface 16a of the back cover portion 16, and because the first fold line 24 of the internal substrate 20 is spaced from the generally vertical fold line 22 between the front and back cover portions 14 and 16 when the booklet-shaped advertiser 12 is closed, and due to the vertical edge 20b being adhesively secured to the anchoring strip 18, the second fold line 26 moves toward the edge 18d of the anchoring strip 18 as the booklet-shaped advertiser 12 is opened, and the notches 20c and 20d permit the necessary movement that causes the semi-cylindrical pop-up 28 to be formed (compare FIGS. 2 and 3).

Still referring to FIGS. 1–4, the internal substrate 20 may be formed to include a plurality of coupons 30a–30d which may enhance the desirability of the pop-up advertising piece 10. These coupons will, of course, be formed in a loose portion of the internal substrate 20 remote from the pop-up 28 and beyond where the vertical edge 20a is adhesively secured to the normally inwardly facing surface 16a of the back cover portion 16. As shown, the coupons 30a–30d can easily be removed by providing a vertical line of perforation 34 which is intersected by a plurality of horizontal lines of perforation 36, 38 and 40.

From the foregoing, it will be appreciated that the pop-up advertising piece 10 is unique and is such that it will capture the attention of a consumer. It can be used for a wide variety of products wherein a prominent display of the product or packaging can be placed on the pop-up 28 with graphics and/or text, and the remainder of the internal substrate 20 as well as the visible portions of the normally inwardly facing surfaces 14a and 16a can also contain graphics and/or text relating to the product (or service) advertised. If the pop-up advertising piece 10 is provided with coupons 30a–30d, they can be designed as a purchasing incentive for the product addressed in the advertising piece 10.

In addition, since the pop-up 28 lies flat when the booklet-shaped advertiser 12 is closed, the pop-up advertising piece 10 is well suited for use as a mailer. It is only necessary to form the booklet-shaped advertiser 12 in a size and shape meeting postal regulations and to use any conventional sealing technique to maintain the booklet-shaped advertiser in a closed position until it reaches the recipient. When that occurs, the recipient can open the booklet-shaped advertiser causing the pop-up 28 to assume a generally semi-cylindrical form thereby drawing attention.

Referring to the second embodiment illustrated in FIGS. 5–8, it corresponds very closely to the embodiment illustrated in FIGS. 1–4 and, thus, the prime numbers define corresponding components of the pop-up advertising piece 10 and the pop-up advertising piece 10'. With regard to the differences in the two embodiments, they will be described in some detail in order to facilitate an understanding whereas the common elements need not be described since they will be understood from their description in connection with the pop-up advertising piece 10.

As for the differences, it will be noted that the internal substrate 20' has the vertical edge 20a' opposite the anchoring strip 18' secured to the normally inwardly facing surface 16a' of the back cover portion 16' much nearer the generally vertical fold line 22' between the front and back cover portions 14' and 16'. The reason for this difference is that the pop-up advertising piece 10' does not include coupons such as 30a–30d and, thus, by so positioning the vertical edge 20a', there is a much larger directly exposed area on the normally inwardly facing surface 16a' of the back cover portion 16' for providing graphic and/or text for advertising purposes. In addition to the foregoing, the pop-up 28' in the pop-up advertising piece 10' will be seen to have a double-thickness (i.e., two spaced cylindrical walls), as well as a window in the outer wall.

More specifically, the pop-up 28' has an outer surface or wall 28a' and an inner surface or wall 28b' with the outer surface or wall 28a' being essentially identical to the sole surface or wall of the pop-up 28' in the pop-up advertising piece 28. The outer surface or wall 28a' is defined between the second fold line 26' and the vertical edge 20b' in precisely the same manner as the inner surface or wall 28b' which comprises an extension of the internal substrate 20' that is reverse folded as at 42, caused to have a vertical fold line 44, caused to have a vertical fold line as at 46, and adhesively secured along a vertical edge 48 nested within the vertical fold line 26'. With this arrangement, the vertical edge 20b' is still adhesively secured to the anchoring strip 18' but the adhesive does not extend beyond the vertical fold line 44.

As a result, the pop-up 28' is quite unique in that it presents two pop-up surfaces or walls, i.e., 28a' and 28b' wherein the outer surface 28a' is formed to have a window 50 which is oval in the illustrated embodiment. The window 50 is formed such that the window flap 52 opens automatically when the pop-up 28' is opened by the consumer. In order to give a view of the graphics and/or text on the inner surface or wall 28b' of the pop-up 28'. By providing this feature, the pop-up advertising piece 10' is even more unique and likely to draw the attention of the consumer to stimulate interest in a product that is being advertised.

While in the foregoing specification preferred embodiments of the invention have been described in detail, it will be appreciated that they have been set forth merely for purposes of illustration to understand the inventive concepts, and the present invention is only to be limited by the true spirit and scope of the appended claims.

What is claimed is:

1. A pop-up advertising piece, comprising:

a booklet-shaped advertiser defined by a front cover portion and a back cover portion integral therewith, the front cover portion having a width and also having a normally inwardly facing surface and a normally outwardly facing surface, the back cover portion having a width and also having a normally inwardly facing surface and a normally outwardly facing surface, the front cover portion being integrally associated with the back cover portion along a generally vertical fold line;

the booklet-shaped advertiser being movable from a closed position with the normally inwardly facing surfaces in confronting relation to an open position with the normally inwardly facing surfaces facing outwardly in a substantially common plane;

an anchoring strip in vertical confronting relation to the normally inwardly facing surface of one ofthe front and back cover portions, having a width substantially less than the width of the corresponding one of the front and back cover portions, and having top and bottom edges secured to the inwardly facing surface of the corresponding one of the front and back cover portions in general proximity to top and bottom edges thereof;

an internal substrate overlying at least a portion of each of the normally inwardly facing surfaces of the front and back cover portions, the internal substrate having one vertical edge secured to the normally inwardly facing surface of the other of the front and back cover portions opposite the anchoring strip and having the other vertical edge secured to the anchoring strip on a surface thereof facing away from the normally inwardly facing surface of the corresponding one of the front and back cover portions, the internal substrate having a first fold line in spaced relation to the generally vertical fold line when the booklet-shaped advertiser is in the closed position;

the internal substrate having a second fold line on a side of the anchoring strip opposite the first fold line, the internal substrate *having one portion* extending from the first fold line to the second fold line *and passing* between the anchoring strip and the inwardly facing surface of the corresponding one of the front and back cover portions, the vertical edges of the internal substrate being secured so as to cause [the] *another* portion of the internal substrate between the second fold line and the anchoring strip to pop up when the booklet-shaped advertiser is moved from the closed position to the open position, the second fold line of the internal substrate being caused to move toward the anchoring strip thereby.

*2. A pop-up advertising piece, comprising:*

*a booklet-shaped advertiser defined by a front cover portion and a back cover portion integral therewith, the front cover portion having a width and also having a normally inwardly facing surface and a normally outwardly facing surface, the back cover portion having a width and also having a normally inwardly facing surface and a normally outwardly facing surface, the front cover portion being integrally associated with the back cover portion along a generally vertical fold line;*

*the booklet-shaped advertiser being movable from a closed position with the normally inwardly facing surfaces in confronting relation to an open position with the normally inwardly facing surfaces facing outwardly in a substantially common plane;*

*an anchoring strip in vertical confronting relation to the normally inwardly facing surface of one of the front and back cover portions, having a width substantially less than the width of the corresponding one of the front and back cover portions, and having top and bottom edges secured to the inwardly facing surface of the corresponding one of the front and back cover portions in general proximity to top and bottom edges thereof;*

*an internal substrate overlying at least a portion of each of the normally inwardly facing surfaces of the front and back cover portions, the internal substrate being integrally associated with the anchoring strip and with the normally inwardly facing surface of the cover portion opposite the anchoring strip, the internal substrate having a first fold line in spaced relation to the generally vertical fold line when the booklet-shaped advertiser is in the closed position, the internal substrate having a second fold line on a side of the anchoring strip opposite the first fold line;*

*the internal substrate having one portion extending from the first fold line to the second fold line and passing between the anchoring strip and the inwardly facing surface of the corresponding one of the front and back cover portions, the internal substrate being integrally associated with the anchoring strip and the normally inwardly facing surface of the cover portion opposite the anchoring strip so as to cause another portion of the internal substrate between the second fold line and the anchoring strip to pop up when the booklet-shaped advertiser is moved from the closed position to the open position, the second fold line of the internal substrate being caused to move toward the anchoring strip thereby.*

* * * * *